United States Patent Office 2,781,096
Patented Feb. 12, 1957

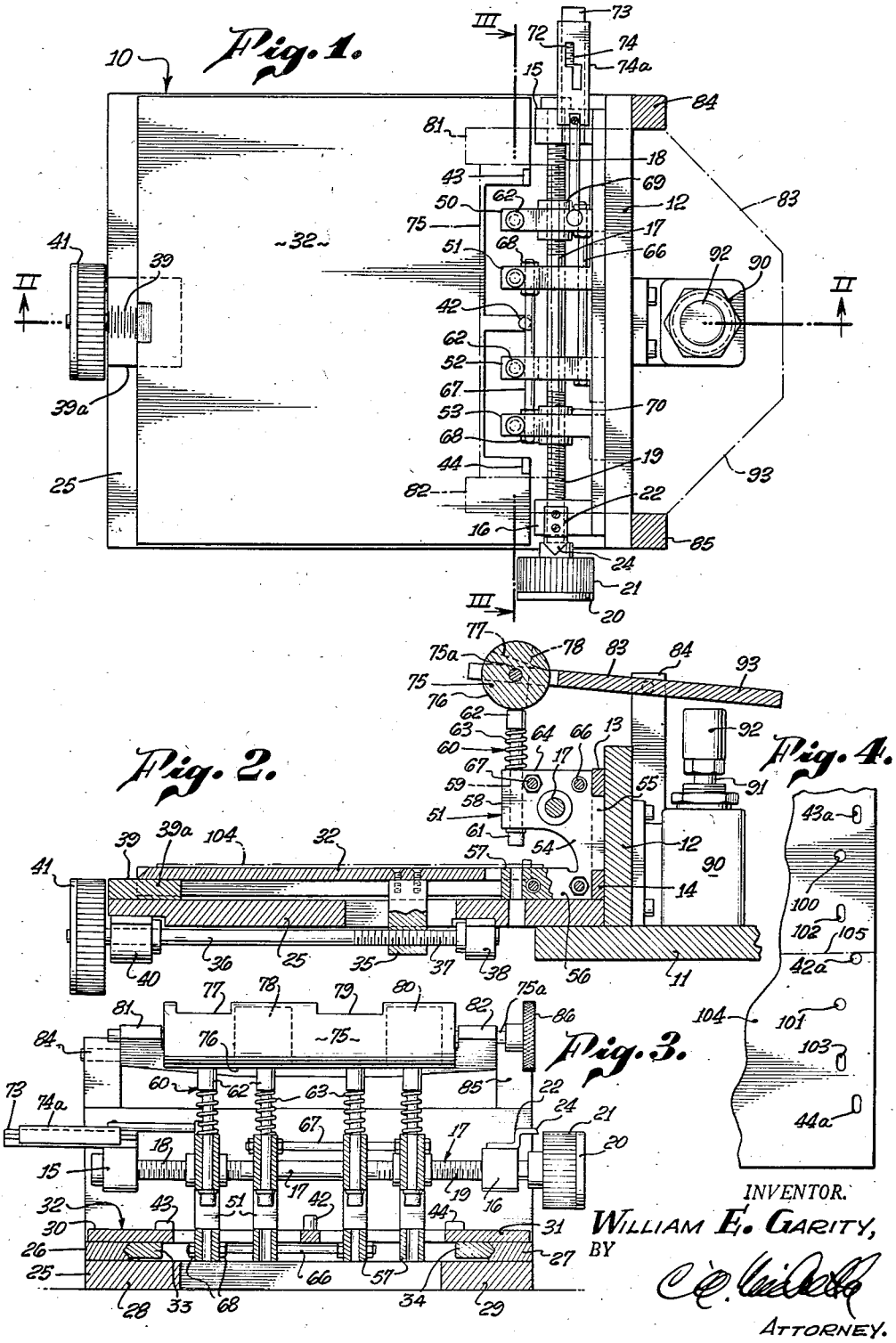
Feb. 12, 1957     W. E. GARITY     2,781,096
ADJUSTABLE PUNCHING DEVICE
Filed Oct. 12, 1953
INVENTOR.
WILLIAM E. GARITY,
BY
ATTORNEY.

2,781,096

ADJUSTABLE PUNCHING DEVICE

William E. Garity, Los Angeles, Calif., assignor to Walter Lantz Productions, Inc., Los Angeles, Calif., a corporation of California Application October 12, 1953, Serial No. 385,611

8 Claims. (Cl. 164—111)

This invention relates to the production and preparation of three dimensional cartoon films, and more particularly to apparatus facilitating the organizing and assembling of a group of flat, transparent cells in both left and right-eye relation for the production of stereoscopic cartoon films.

In the production of motion picture films for stereoscopically depicting animated cartoons, it is required that two pictures or films be made of the same objects, taken from two slightly different, interocularly spaced points of view. The objects are usually painted on transparent cells which are illuminated and photographed by well known so-called stop-motion photographic processes. In order that the two films may be prepared in the least amount of time and with the highest degree of accuracy, the overlay assemblage of transparent cells is constructed in such a way that individual cells may be shifted laterally with respect to others of the cells and normal to the optical axis of the stop-motion camera, which is then not required to be moved. In other words, shifting of certain of the transparent cells from a "left eye" position to a "right eye" position replaces shifting the position of the camera during the filming processes. Such a system of photography is disclosed in my co-pending application Serial No. 375,028 entitled "Method of and Means for Producing Stereoscopic Animated Cartoons," and filed August 18, 1953.

The lateral shifting of certain of the transparent cells with respect to the optical axis of the camera is facilitated by punching left and right-eye pairs of ports or registration holes in the transparent cells, these ports being adapted to be engaged by pegs or pins in a so-called peg bar to align the cells in either left or right-eye bar to align the cells in either left or right-eye relationship prior to photography. The positioning of the left and right-eye punched ports with respect to one another and with respect to the optical axis of the camera is required to be extremely accurate due to the fact that any inaccuracies in cell positioning will be reflected in enlarged and magnified inaccuracies in image depth positioning when the films are finally projected upon a screen.

Accordingly, it is an object of the invention to provide a novel punching device for use in selectively forming ports or registration holes in cells of the type used in producing stereoscopic motion picture films, the punching device including novel means for adjusting the position of the cell and punches in such a way as to achieve desired lateral and longitudinal positioning of the punched ports in the cell, there being included novel means for obtaining a lateral disposition of punched ports such that alternate pairs of ports are equally and oppositely displaced as a group from a longitudinal center line.

It is another object of the invention to provide a novel punching device including novel means for interconnecting and adjusting a group of selectively operable punches in such a way that alternate pairs of punches are simultaneously and equally movable in opposite directions with respect to one another, with the result that a cell having been punched by the device may be successively and accurately pegged in both left and right-eye positions, in the production of variable image depth stereoscopic films.

It is a further object of the invention to provide a novel punching device including novel means for effecting operation of a group of punches either as a group or in alternate pairs, as selected.

These and various other objects and advantages of the present invention will become apparent to those skilled in the art from the following description of certain illustrative examples. In order to facilitate understanding of the invention, reference will be had to the appended drawings in which:

Fig. 1 is a plan view of a punching device incorporating one form of the present invention which may be used in the production of registration holes in transparent cells.

Fig. 2 is a sectional view in elevation taken on line II—II of Fig. 1.

Fig. 3 is a sectional view in elevation taken on line III—III of Fig. 1.

Fig. 4 is a plan view of a portion of a transparent cell showing the disposition of the holes punched therein by means of the present invention.

Referring now to the drawings, the numeral 10 designates the body of one form of punching device incorporating the present invention, the body including a bottom or base 11 and a back portion 12 which is fastened to the base and extends vertically upright therefrom. Horizontal guide means such as the two elongated rectangular members 13 and 14 are fastened to or formed in the back portion 12, and are vertically spaced thereon. Fastened to opposite ends of the back portion 12 are shaft supporting members such as the two journal members 15 and 16. The horizontally extending shaft 17 supported at opposite ends thereof by the journal members 15 and 16 has spaced threaded portions formed thereon such as portions 18 and 19 which are positioned inwardly from the ends of the shaft, the threads on one threaded portion being oppositely inclined from those on the second threaded portion. One end of the shaft carries an adjusting knob 20, which has its circumference accurately graduated in a convenient scale 21, and an indicator 22 which is fastened to support member 16 has an arrowhead 24 pointing toward the scale 21 on the knob to indicate the angular displacement of the shaft.

A second horizontally extending base member 25 is fastened to base member 11, and longitudinally extending table guide means such as the V-grooved plates 26 and 27 are supported by and located above the lateral portions 28 and 29 of the second base member 25. The plates 26 and 27 are adapted to support the lateral edges 30 and 31 of a flat table 32, which is movable longitudinally toward or away from the guides 13 and 14, there being provided V-shaped tongue members 33 and 34 fastened to the under side of the plate and engaging the V-grooved plates 26 and 27 respectively in such manner as to guide the table and to prevent lateral displacement thereof during longitudinal movement. The table may be moved longitudinally by means of an accurate screw threaded adjustment device which may include internally threaded block 35 fastened to the under side of the table 32 and extending downwardly therefrom through an aperture in base 25, and a longitudinally extending shaft 36 having a threaded portion 37 engaging the internally threaded portion of the block.

The right or inner end of shaft 36 is freely journaled in journal member 38 extending downwardly from the base member 25, and the left end of the shaft is journaled in block 40 which is also attached to base member 25 near the left end thereof. An adjusting knob 41 is carried by the outer end of the shaft 36, and rotation of knob 41 will move table 32 toward or away from the punch head 51. The extent of such movement may be visually observed upon scribe lines or indexing means 39 (carried by block 39a fastened to frame base 25) with relation to an edge of table 32. This permits accurate placement of punched registration ports with respect to a desired portion of a cell, and is particularly useful where cells are used in connection with a "panning" shot or sequence, whether horizontal or vertical panning is used.

Positioned on the rightward end of the table 32 are a group of work-locating pins such as the center pin or peg 42 and the side pins 43 and 44 which are offset laterally from pin 42 and are positioned on opposite sides thereof. Pins 42, 43, and 44 are adapted to engage registration ports in cells of the type illustrated in Fig. 4, in order to position such cells on the table and to prevent horizontal movement thereof. The pins 42, 43 and 44 engage ports 42a, 43a, and 44a in the cell shown in Fig. 4.

A group of punching devices such as the four punch frames 50, 51, 52 and 53 are disposed laterally adjacent the back portion 12 and above the base member 25. Each punch frame includes a vertically disposed body portion 54 having a slotted or grooved back 55 adapted to position the frame in slidable engagement with the transversely extending vertically spaced guides 13 and 14 for guided movement in a lateral direction. Each punch frame also includes a longitudinally extending base portion 56 carrying a female die 57, and a longitudinally extending arbor 58 overhanging the base portion 56. The arbor 58 contains a vertical slot or aperture adapted to mount the shaft 59 of a punch member 60, which is disposed vertically above the female die 57. An apertured resilient stripper sleeve 61 is mounted below the arbor 58 in alignment with the shaft 59 of the punch and serves the purpose of stripping the punch out of the punched material when the punch is retracted upwardly following a punching operation. A head 62 in the form of a cap is fixedly mounted on the upper end of the punch 60, and a compression spring 63 is fitted between the head 62 and the upper surface 64 of the arbor, the spring serving to urge the punch 60 upwardly after a punching operation.

Alternate punch frames 50 and 52, and 51 and 53 are rigidly connected together as by means of the rods 66 and 67, the ends of each of the rods being threaded to receive nuts 68 for tightening the rods on the punch frames. Rod 66 passes freely through an aperture in punch frame 51, and rod 67 likewise passes freely through an aperture in punch frame 52. The adjusting shaft 17 passes through all body portions of all the punch frames, and novel means are provided for threadedly connecting one punch frame of each connected pair to the shaft in such a way that when the shaft is rotated, the two pairs of punch frames will move toward or away from one another simultaneously and equally. One such means may include an internally threaded sleeve 69 attached to the end punch frame 50, the sleeve 69 being adapted to engage the threaded portion 18 of the shaft 17, and a second internally threaded sleeve 70 affixed the opposite end frame 53, the sleeve 70 engaging the oppositely threaded portion 19 of the shaft. It will be noted that when the shaft is rotated in one angular direction, punch frame pair 50 and 52 will be caused to move toward the alernate punch frame pair 51 and 53, and provided the pitch of the threaded portions 18 and 19 are equal and quite small, a fine adjustment of the punch frame pairs will be achieved by which each of the pairs may be caused to be controllably moved toward or away from each other in equal amounts which are small in magnitude compared with the physical angular displacement of the circumference of the control knob 20. Accurate lateral positioning of the punch frame pairs may be facilitated by a graduated scale 72 which may be mounted on fixed laterally extending member 73. A movable indicator 74 may then be affixed to a slidable transparent sheath 74a which extends over the scale 72 and is rigidly connected to the punch frame 50. As the punch frame 50 is moved laterally, the extent of such movement may be read directly off the scale 72.

The punches may be operated as a group or selectively by means of a punch operating head such as the horizontally disposed, controllably rotatable member 75. The latter may comprise a cylinder having a longitudinally extending continuous face portion 76, and also spaced flats 77, 78, 79 and 80 formed in the cylinder. The pairs of flats 77, and 79 are adapted to be positioned over the punches mounted in connected punch frames 50 and 52 while the pair of flats 78 and 80 are adapted to be positioned over the punches mounted in connected punch frames 51 and 53. The two flats in each pair are coplanar; however, the plane of flat 77 and 79 is set at an angle with respect to the plane of flats 78 and 80, the angular relationship between the two planes being defined about the major axis of the cylinder 75. The cylinder is fastened to a shaft 75a which passes therethrough along the cylinder axis, the ends of the shaft being frictionally journaled in swingable parallel arms 81 and 82, which project outwardly from a plate 83, which is in turn pivoted about horizontal pins set in uprights 84 and 85. The latter may be conveniently fastened to the back portion 12 of the body 10. A cylinder control knob 86 is attached to one end of the cylinder and serves as a means for selecting the portion of the cylinder 75 which it may be desired to bring into engagement with the punches carried by the punch frames. For example, should it be desired to actuate all four punches simultaneously, the knob 86 may be rotated to present the continuous face portion 76 of the cylinder above the punch heads 62 of all the punches; however, should it be desired to actuate only the punches carried by the punch frames 50 and 52, the knob is partially rotated until the flats 78 and 80 are presented over the punches carried by punch frames 51 and 53, and the punch operating head is then forced downwardly so as to cause the surface of the cylinder above the punches carried by frames 50 and 52 to force those punches downwardly into the work carried by the table 32. It will be noted that the depth of each flat, as measured by the radial distance between the surface of the cylinder and the flat surface taken on a radius which lies perpendicular to the flat surface, is greater than the depth of the female die 57 carried by the base portion of the punch frame in order that the punches engaged by the flats on a downward stroke of the punch operating head may be precluded from punching holes in the work, it being desired that only those punches engaged by the surface of the cylinder 75 do the hole punching.

The punch operating head may be forced downwardly against the punch heads 62 by powered means such as the air cylinder 90 which is mounted on base 11 rightwardly of the uprights 84 and 85, with the linear actuating arm 91 thereof positioned vertically. The actuating head 92 fastened to the arm 91 is moved vertically against the underside of the overhanging portion 93 of the plate 83 when the cylinder is actuated, causing the plate to rotate counterclockwise, the punch operating head to be moved downwardly, forcing all of the punches or selected pairs thereof downwardly into the work.

It will be appreciated from the above description that the work positioning and punch operating elements of the punching device are arranged to co-act in a novel way to bring about desired selectivity and accuracy in the punching operation, the device providing for accurate adjustable spacing of alternate pairs of holes in the cells as measured from the longitudinal center line passing through center pin hole 42a; the novel arrangement of co-acting parts provides for simultaneous movement of one pair of punch frames toward or away from a second pair of such frames in equal amounts, which is an important feature of the invention from the standpoint of the spacing of the pairs of ports 100 and 101, and 102 and 103 punched in the cell 104 illustrated in Fig. 4. Thus, by means of the present invention, the holes 100 and 101 which are utilized in mounting the cell for "right-eye" photography are caused to be spaced from the longitudinal center line 105 by amounts which are equal in magnitude respectively to the spacing of the holes 103 and 102 from the same center line and opposite therefrom the latter holes being used in mounting the same cell for "left-eye" photography as described in another portion of this specification.

The invention also permits the selective punching of only one pair of ports in a cell, which ports are then in alignment with either the right or left eye pairs of ports in other cells having the same port spacing, thereby facilitating the mounting of all cells on the same peg board prior to photography. Such a cell is, of course, photographed on only one strip of film in order that the projected image of the object depicted on only the one cell might appear to be in the plane of the screen with no apparent depth given thereto.

All changes and modifications coming within the scope of the appended claims are embraced thereby.

I claim:

1. An adjustable punching device adapted to accurately and selectively form registration ports in cells adapted for use in the production of stereoscopic motion pairs, comprising: a body including a back provided with horizontally extending guides, a shaft having groups of oppositely inclined threads at its end portions, journaled on said body in parallel relation to said guides, and a bottom provided wtih a table mounted for controlled movement toward and away from said guides; two pairs of punch frames mounted for slidable movement on said guides, alternate punch frames being rigidly connected for simultaneous movement, each end frame being in operative threaded engagement with an end portion of the threaded shaft, whereby alternate punch frames are simultaneously and equally in opposite directions; removable, work-locating pins carried by the work table; each punch frame including a female die and a movable punch; a selectively operable punch operating head carried by said frame for actuating the punches in said punch frames, said punch operating head comprising a vertically movable horizontally disposed, controllably rotatable cylinder provided with a continuous, longitudinally extending face portion and spaced flats; said operating head being adapted to be partially rotated to present said continuous face in one position of said head, whereby all four punches may be simultaneously actuated, and a pair of flats in another position of rotation of said head whereby said flats prevent actuation of one selected pair of punches and allows cylindrical surfaces of said head to simultaneously operate the other selected pair of punches; and means for controllably actuating said threaded shaft and indicating the position or spacing of the punches.

2. In a punching device for forming registration ports in cells adapted for use in stereoscopic photography: a body including horizontally extending guide means and a shaft carried by said body in parallel relation to said guide means, said shaft having two oppositely inclined thread groups formed on spaced portions thereof; two pairs of spaced punch frames adapted to slidably engage said guide means, alternate punch frames being rigidly connected for simultaneous movement and forming a pair, one punch frame of one pair of punches being in threaded engagement with one of said thread groups and one frame of the other pair of punches being in threaded engagement with the other thread group, whereby alternate punch frames may be moved simultaneously and equally in opposite directions; and a punch operating head adapted to selectively actuate punches carried by said punch frames, said head including a horizontally disposed member provided with a continuous face portion and spaced flats, said head being adapted to be partially rotated to position alternate flats above alternate punches, whereby a selected pair of punches may be simultaneously actuated.

3. In a punching device for forming registration ports in cells adapted for use in stereoscopic photography: a body including horizontally extending guide means and a shaft carried by said body in parallel relation to said guide means, said shaft having two oppositely inclined thread groups formed on spaced portions thereof; two pairs of spaced punch frames adapted to slidably engage said guide means, alternate punch frames being rigidly connected for simultaneous movement and forming a pair, one punch frame of one pair of punches being in threaded engagement with one of said thread groups and one frame of the other pair of punches being in threaded engagement with the other thread group, whereby alternate punch frames may be moved simultaneously and equally in opposite directions; and means for selectively actuating either all of said punches or a selected one pair of punches.

4. In a punching device for forming registration ports in cells adapted for use in stereoscopic photography: a body including horizontally extending guide means, and a shaft carried by said body in parallel relation to said guide means, said shaft having oppositely inclined thread groups formed on spaced portions thereof; a plurality of spaced punch frames adapted to slidably engage said guide means, alternate punch frames being rigidly connected for simultaneous movement and forming a pair, one punch frame of one pair of punches being in threaded engagement with one of said thread groups and one frame of the other pair of punches being in threaded engagement with the other thread group, whereby alternate punch frames may be moved simultaneously and equally in opposite directions; a table mounted for controlled movement toward and away from said guide means, said table carrying guide pins for locating said cells on said table with respect to said punch frames; and means for selectively actuating either all of said punches or a selected one pair of punches.

5. In a punching device for forming registration ports in cells adapted for use in stereoscopic photography: a body including guide means and a shaft having oppositely inclined threads at its end portions, said shaft being journaled on said body in parallel relation to said guide means; two pairs of punch frames mounted for slidable movement on said guide means, alternate punch frames being rigidly connected for simultaneous movement and forming a pair, one punch frame of one pair of punches being in threaded engagement with one of said thread groups and one frame of the other pair of punches being in threaded engagement with the other thread group, whereby alternate punch frames may be moved simultaneously and equally in opposite directions; means for controllably rotating said threaded shaft and for indicating the spacing of the punches carried by said punch frames; and means for selectively actuating either all of said punches or a selected one pair of punches.

6. In a punching device for forming registration ports in cells adapted for use in stereoscopic photography: a body carrying punch means mounted for transverse movement with respect to a work table, said punch means including alternately connected punch carrying frames; and a selectively operable punch operating head for actuating the punches in said punch frames, said punch operating head including a transversely disposed member provided with a continuous face portion for operating all the punches and with spaced flats, said member being adapted to be partially rotated to position one pair of alternate flats above one pair of alternate punches to render them inoperative, whereby said other selected pair of punches may be simultaneously actuated.

7. In a punching device for forming registration ports in cells adapted for use in stereoscopic photography: a body carrying punch means mounted for transverse guided movement, said punch means including alternately connected punch carrying frames; means for simultaneously moving connected pairs of said frames equally and oppositely in a transverse direction; a table mounted for controlled longitudinal movement toward and away from said punch frames, said table carrying guide means for locating said cells on said table with respect to said punch frames; and means for actuating the punches carried by said punch frames, whereby alternate pairs of registration ports in the punched cells are equally and oppositely displaced as a group from a longitudinal center line.

8. In a punching device for forming registration ports in cells adapted for use in stereoscopic photography: a body including a back provided with horizontally extending guides, and a shaft having oppositely inclined threads at its end portions, said shaft being journaled on said body in parallel relation to said guides; a work table mounted for controlled movement toward and away from said guides, said table carrying cell locating means; two pairs of punch frames mounted for slidable movement on said guides; alternate punch frames being rigidly connected for simultaneous movement, each end frame being in operative threaded engagement with an end portion of the threaded shaft; and a selectively operable punch operating head for actuating the punches in said punch frames, said head including a horizontally disposed, controllably rotatable member provided with a continuous face portion and spaced flats, said head being adapted to be partially rotated to present said continuous face in one position of said head, whereby all four punches may be simultaneously actuated, and to present a pair of flats in another position of rotation of said head whereby said flats prevent actuation of one selected pair of punches and allows cylindrical surfaces of said head to simultaneously operate the other selected pair of punches.

References Cited in the file of this patent

UNITED STATES PATENTS

| | | |
|---|---|---|
| 806,914 | Pitt | Dec. 12, 1905 |
| 1,331,563 | Genter | Feb. 24, 1920 |
| 1,553,378 | Harper | Sept. 15, 1925 |
| 1,615,724 | Pierce | Jan. 25, 1927 |
| 2,163,641 | Wales | June 27, 1939 |

FOREIGN PATENTS

| | | |
|---|---|---|
| 239,994 | Germany | Oct. 26, 1911 |